US012229567B2

(12) United States Patent
Creed et al.

(10) Patent No.: US 12,229,567 B2
(45) Date of Patent: Feb. 18, 2025

(54) FAULT ISOLATION IN A DIRECTOR PROCESSOR SLICE OR BOARD

(71) Applicant: Dell Products L.P., Round Rock, TX (US)

(72) Inventors: John Creed, Innishannon (IE); Owen Martin, Hopedale, MA (US)

(73) Assignee: Dell Products L.P., Round Rock, TX (US)

( * ) Notice: Subject to any disclaimer, the term of this patent is extended or adjusted under 35 U.S.C. 154(b) by 89 days.

(21) Appl. No.: 18/142,732

(22) Filed: May 3, 2023

(65) Prior Publication Data

US 2024/0370270 A1 Nov. 7, 2024

(51) Int. Cl.
*G06F 9/38* (2018.01)
*G06F 9/30* (2018.01)

(52) U.S. Cl.
CPC ........ *G06F 9/3861* (2013.01); *G06F 9/30038* (2023.08)

(58) Field of Classification Search
None
See application file for complete search history.

(56) References Cited

U.S. PATENT DOCUMENTS

| | | | | |
|---|---|---|---|---|
| 7,496,735 | B2* | 2/2009 | Yourst | G06F 9/3854 |
| | | | | 712/216 |
| 8,977,598 | B2* | 3/2015 | Montulli | G06F 11/1451 |
| | | | | 707/679 |
| 2017/0083322 | A1* | 3/2017 | Burger | G06F 9/3838 |
| 2017/0277537 | A1* | 9/2017 | Grocutt | G06F 9/30087 |
| 2019/0179767 | A1* | 6/2019 | Tsirkin | G06F 9/5077 |
| 2021/0149788 | A1* | 5/2021 | Downie | G06F 11/3604 |
| 2023/0049144 | A1* | 2/2023 | Jung | G06F 21/31 |

* cited by examiner

*Primary Examiner* — Michael Sun
(74) *Attorney, Agent, or Firm* — Krishnendu Gupta; Nikhil Patel

(57) ABSTRACT

One or more aspects of the present disclosure relate to isolating faults corresponding to a thread or thread group to avoid dropping a director processor slice or board. In embodiments, an execution flow corresponding to a slice on a director board of a storage array is monitored. For example, the execution flow includes a thread or a thread group. Additionally, an exception event corresponding to the execution flow is identified. Further, the execution flow is isolated based on an analysis of the exception event.

18 Claims, 5 Drawing Sheets

FAULT ISOLATION IN A DIRECTOR PROCESSOR SLICE OR BOARD

BACKGROUND

A storage array performs block-based, file-based, or object-based storage services. Rather than store data on a server, storage arrays can include multiple storage devices (e.g., drives) to store vast amounts of data. For example, a financial institution can use storage arrays to collect and store financial transactions from local banks and automated teller machines (ATMs) related to, e.g., bank account deposits/withdrawals. In addition, storage arrays can include a central management system (CMS) that manages the data and delivers one or more distributed storage services for an organization. The central management system can include one or more processors that perform data storage services.

SUMMARY

One or more aspects of the present disclosure relate to isolating faults corresponding to a thread or thread group to avoid dropping a director processor slice or board. In embodiments, an execution flow corresponding to a slice on a director board of a storage array is monitored. For example, the execution flow includes a thread or a thread group. Additionally, an exception event corresponding to the execution flow is identified. Further, the execution flow is isolated based on an analysis of the exception event.

In embodiments, whether the exception event corresponds to previous consecutive exception events of the execution flow can be determined.

In embodiments, whether an operational status of the slice is compromised without the execution flow can be determined.

In embodiments, the execution flow can be provided with a mask defining its dependencies. Additionally, dependencies of the execution flow can be identified using its mask.

In embodiments, at least one event stack trace can be parsed to determine if the exception event corresponds to previous exception events of the execution flow.

In embodiments, the slice and the director board can be prevented from entering a dead director (DD) mode if, without the execution flow, the operational status of the slice is uncompromised.

In embodiments, a crash event occurrence can be identified. In addition, the exception event can be identified as a cause of the crash event occurrence. Further, the exception flow can be identified as the source of the crash event occurrence based on a process identifier (ID) corresponding to the exception event.

In embodiments, the process ID can include a thread number identifying the execution flow as a thread source of the exception event.

In embodiments, at least one processor related to the execution flow can be identified using the execution flow's mask.

In embodiments, the execution flow can be disabled when the at least one processor initiates an initial microcode load (IML) after the exception event occurs.

Other technical features may be readily apparent to one skilled in the art from the following figures, descriptions, and claims.

BRIEF DESCRIPTION OF THE DRAWINGS

The preceding and other objects, features, and advantages will be apparent from the following more particular description of the embodiments, as illustrated in the accompanying drawings. Like reference, characters refer to the same parts throughout the different views. The drawings are not necessarily to scale, emphasis instead being placed upon illustrating the embodiments' principles.

DETAILED DESCRIPTION

A business like a financial or technology corporation can produce large amounts of data and require sharing access to that data among several employees. These companies often use a storage array to store and manage the data. Because a storage array can include multiple storage devices (e.g., hard-disk drives (HDDs) or solid-state drives (SSDs)), a company can scale (e.g., increase or decrease) and manage the array's storage capacity more efficiently than that of a server. Additionally, a storage array can include engines that deliver one or more storage services. For example, each engine can include one or more director boards with at least one slice processor (slice) configured to perform a distinct set of storage services.

Occasionally, a slice of a director board can experience an exception fault. Sometimes, the slice or the director board can maintain functionality when experiencing the exception fault. However, current naïve techniques drop the slice or director board into a non-functioning dead director (DD) mode. For example, the current naïve techniques maintain a fault counter and drop the slice or director board when the fault counter reaches or exceeds a threshold.

Rather than dropping the slice or director board, embodiments of the present disclosure identify the thread or thread group responsible for the exception fault. For example, the embodiments can identify the thread or thread group when an exception recovery technique handles the exception fault. Accordingly, the embodiments can disable the identified thread during a microcode load (ML) (e.g., an initial ML (IML)) of the slice or director board corresponding to the identified thread. Thus, the embodiments can advantageously isolate the exception fault, enabling the slice or director board to remain operational. Moreover, the embodiments can prevent issues that can arise as a result of dropping the slice or director board.

Figure 1:
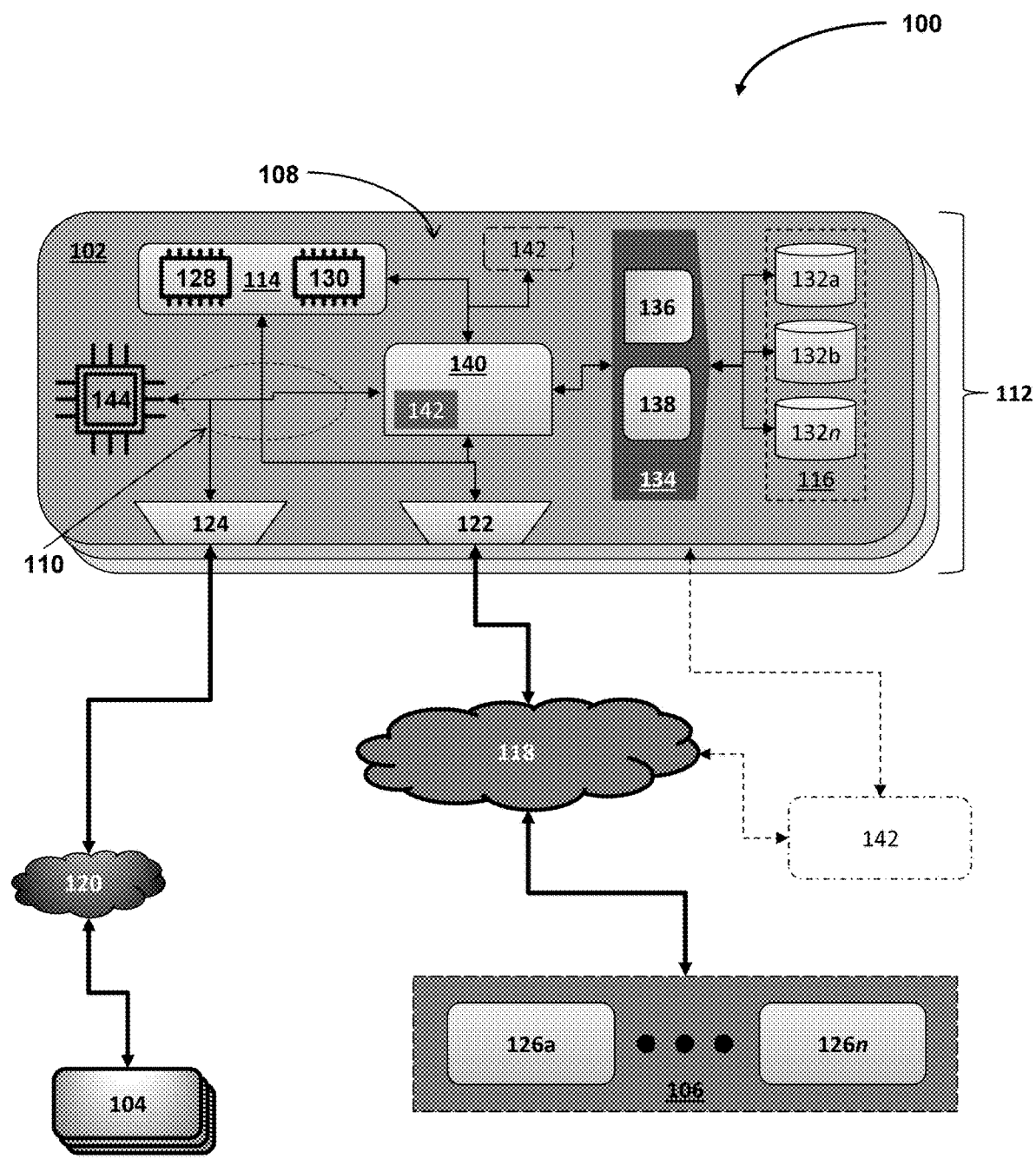
FIG. 1 illustrates a distributed network environment in accordance with embodiments of the present disclosure.

Regarding FIG. 1, a distributed network environment 100 can include a storage array 102, a remote system 104, and hosts 106. In embodiments, the storage array 102 can include components 108 that perform one or more distributed file storage services. In addition, the storage array 102 can include one or more internal communication channels 110 like Fibre channels, busses, and communication modules that communicatively couple the components 108. Further, the distributed network environment 100 can define an array cluster 112, including the storage array 102 and one or more other storage arrays.

In embodiments, the storage array 102, components 108, and remote system 104 can include a variety of proprietary or commercially available single or multi-processor systems (e.g., parallel processor systems). Single or multi-processor systems can include central processing units (CPUs), graphical processing units (GPUs), and the like. Additionally, the storage array 102, remote system 104, and hosts 106 can virtualize one or more of their respective physical computing resources (e.g., processors (not shown), memory 114, and persistent storage 116).

In embodiments, the storage array 102 and, e.g., one or more hosts 106 (e.g., networked devices) can establish a network 118. Similarly, the storage array 102 and a remote system 104 can establish a remote network 120. Further, the network 118 or the remote network 120 can have a network architecture that enables networked devices to send/receive electronic communications using a communications protocol. For example, the network architecture can define a storage area network (SAN), local area network (LAN), wide area network (WAN) (e.g., the Internet), an Explicit Congestion Notification (ECN), Enabled Ethernet network, and the like. Additionally, the communications protocol can include a Remote Direct Memory Access (RDMA), TCP, IP, TCP/IP protocol, SCSI, Fibre Channel, Remote Direct Memory Access (RDMA) over Converged Ethernet (ROCE) protocol, Internet Small Computer Systems Interface (iSCSI) protocol, NVMe-over-fabrics protocol (e.g., NVMe-over-ROCEv2 and NVMe-over-TCP), and the like.

Further, the storage array 102 can connect to the network 118 or remote network 120 using one or more network interfaces. The network interface can include a wired/wireless connection interface, bus, data link, and the like. For example, a host adapter (HA 122), e.g., a Fibre Channel Adapter (FA) and the like, can connect the storage array 102 to the network 118 (e.g., SAN). Further, the HA 122 can receive and direct IOs to one or more of the storage array's components 108, as described in greater detail herein.

Likewise, a remote adapter (RA 124) can connect the storage array 102 to the remote network 120. Further, the network 118 and remote network 120 can include communication mediums and nodes that link the networked devices. For example, communication mediums can include cables, telephone lines, radio waves, satellites, infrared light beams, etc. Additionally, the communication nodes can include switching equipment, phone lines, repeaters, multiplexers, and satellites. Further, the network 118 or remote network 120 can include a network bridge that enables cross-network communications between, e.g., the network 118 and remote network 120.

In embodiments, hosts 106 connected to the network 118 can include client machines 126a-n, running one or more applications. The applications can require one or more of the storage array's services. Accordingly, each application can send one or more input/output (IO) messages (e.g., a read/write request or other storage service-related request) to the storage array 102 over the network 118. Further, the IO messages can include metadata defining performance requirements according to a service level agreement (SLA) between hosts 106 and the storage array provider.

In embodiments, the storage array 102 can include a memory 114, such as volatile or nonvolatile memory. Further, volatile and nonvolatile memory can include random access memory (RAM), dynamic RAM (DRAM), static RAM (SRAM), and the like. Moreover, each memory type can have distinct performance characteristics (e.g., speed corresponding to reading/writing data). For instance, the types of memory can include register, shared, constant, user-defined, and the like. Furthermore, in embodiments, the memory 114 can include global memory (GM 128) that can cache IO messages and their respective data payloads. Additionally, the memory 114 can include local memory (LM 130) that stores instructions that the storage array's processors 144 can execute to perform one or more storage-related services. For example, the storage array 102 can have a multi-processor architecture that includes one or more CPUs (central processing units) and GPUs (graphical processing units).

In addition, the storage array 102 can deliver its distributed storage services using persistent storage 116. For example, the persistent storage 116 can include multiple thin-data devices (TDATs) such as persistent storage drives 132a-n. Further, each TDAT can have distinct performance capabilities (e.g., read/write speeds) like hard disk drives (HDDs) and solid-state drives (SSDs).

Further, the HA 122 can direct one or more IOs to an array component 108 based on their respective request types and metadata. In embodiments, the storage array 102 can include a device interface (DI 134) that manages access to the array's persistent storage 116. For example, the DI 134 can include a disk adapter (DA 136) (e.g., storage device controller), flash drive interface 138, and the like that control access to the array's persistent storage 116 (e.g., storage devices 132a-n).

Likewise, the storage array 102 can include an Enginuity Data Services processor (EDS 140) that can manage access to the array's memory 114. Further, the EDS 140 can perform one or more memory and storage self-optimizing operations (e.g., one or more machine learning techniques) that enable fast data access. Specifically, the operations can implement techniques that deliver performance, resource availability, data integrity services, and the like based on the SLA and the performance characteristics (e.g., read/write times) of the array's memory 114 and persistent storage 116. For example, the EDS 140 can deliver hosts 106 (e.g., client machines 126a-n) remote/distributed storage services by virtualizing the storage array's memory/storage resources (memory 114 and persistent storage 116, respectively).

In embodiments, the storage array 102 can also include a controller 142 (e.g., management system controller) that can reside externally from or within the storage array 102 and one or more of its components 108. When external from the storage array 102, the controller 142 can communicate with the storage array 102 using any known communication connections. For example, the communications connections can include a serial port, parallel port, network interface card (e.g., Ethernet), etc. Further, the controller 142 can include logic/circuitry that performs one or more storage-related services. For example, the controller 142 can have an architecture designed to manage the storage array's computing, processing, storage, and memory resources as described in greater detail herein.

Figure 2:
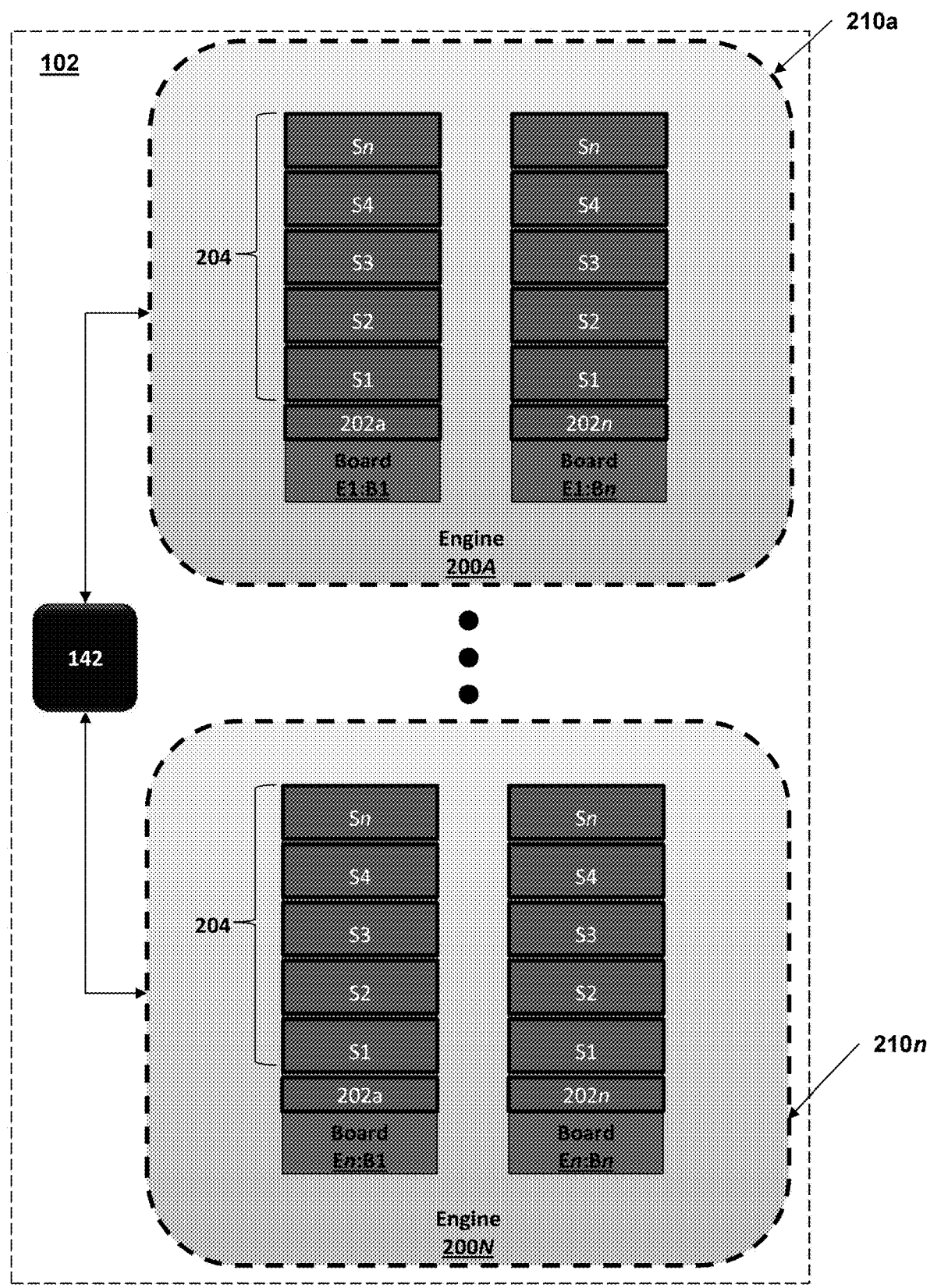
FIG. 2 is a block diagram of a storage engine in accordance with embodiments of the present disclosure.

Regarding FIG. 2, the storage array 102 can include engines 200 with logic, circuitry, and hardware that perform storage services. For example, the storage array 102 can house each engine 200A-N in a corresponding housing 210a-n (e.g., shelves). Furthermore, each engine 200A-N can include boards (e.g., director boards) E1:B1-E1:Bn, En:B1-En:Bn with one or more slices (e.g., emulations) 204 of the storage array's components 108 of FIG. 1. For example, the boards E1:B1-E1:Bn, En:B1-En:Bn can include slices S1-n, each emulating one of the components 108 of the storage array 102. In embodiments, the engines 200A-n can also include corresponding shared board-level memory 206a-n. Additionally, the boards E1:B1-E1:Bn, En:B1-En:Bn can include corresponding shared slice-level memory 202a-n (e.g., DRAM). Further, a controller 142 can access the engines 200A-N and their corresponding boards E1:B1-En:Bn to perform fault mitigation services described in greater detail herein.

Figure 2A:
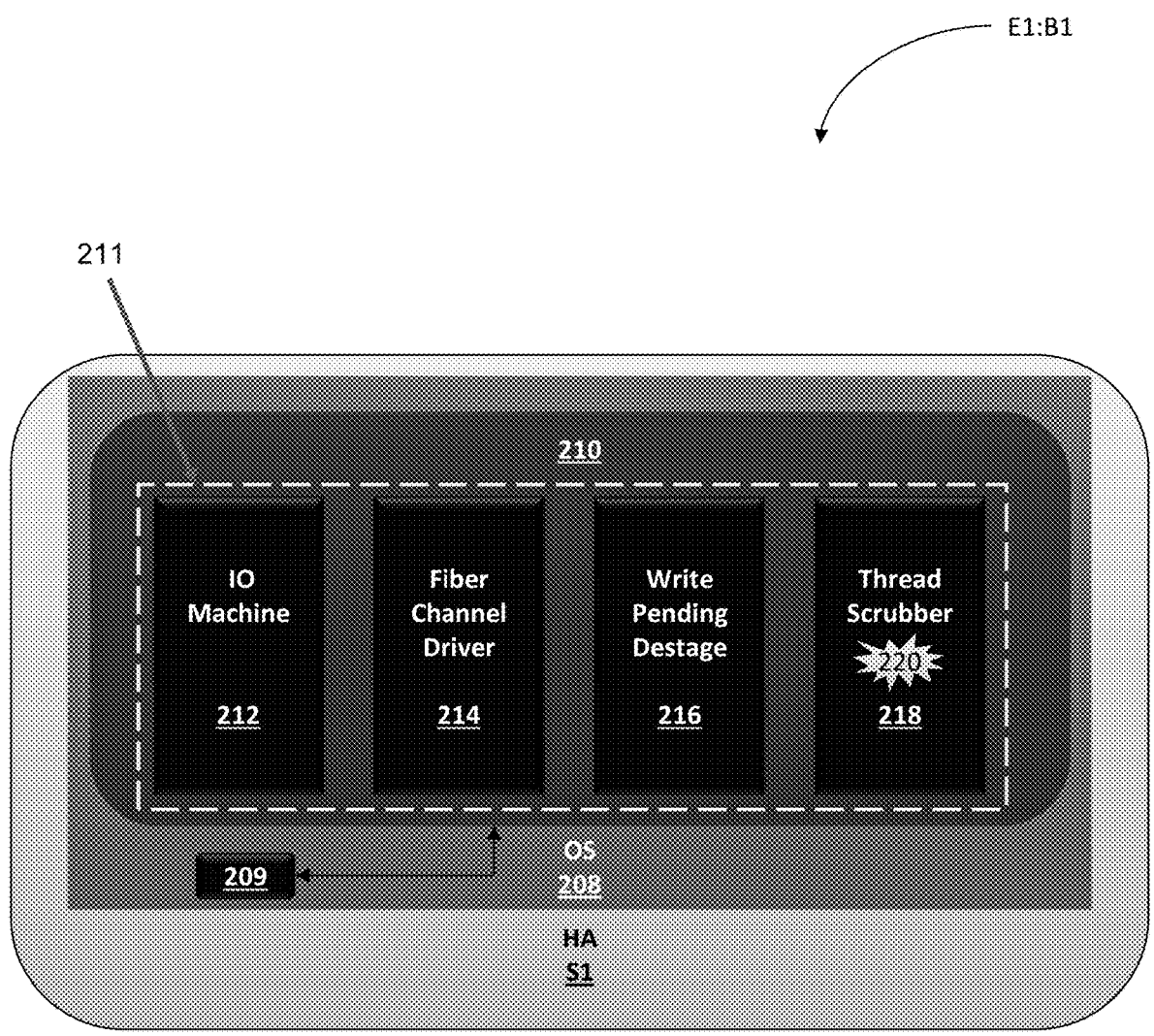
FIG. 2A is a block diagram of a slice residing on a director board per embodiments of the present disclosure.

Regarding FIG. 2A, a director board's slices (e.g., slices 204 of FIG. 2) can include logic, circuitry, and hardware configured to perform services corresponding to their components 108. Additionally, each slice can include threads or thread groups with one or more one or more execution units of storage service processes. For instance, the service processes can correspond to their slice's corresponding component services.

In embodiments, the director board E1:B1 can include an HA slice S1 (e.g., an emulation) corresponding to the HA 122 of FIG. 1. The HA slice S1 can also include an operating system (OS) 208 configured to perform HA-related services. Further, the OS 208 can include a loader (e.g., an initial microcode load (IML) or firmware) 209 that performs slice resource services. The loader 209 can detect logical and physical resources accessible to the HA slice S1 when the OS 208 boots. For example, the loader 209 can identify the threads or thread groups (collectively, "threads") 211 corresponding to the HA slice S1. Additionally, the threads 211 can include masks defining their respective processor assignments. Accordingly, the loader 209 can enable processor resources for the threads 211 using their masks. In addition, the loader 209 can enable a scheduler 210 of the OS 208 to manage the execution of the threads 211.

In embodiments, the threads 211 can include IO machine 212, fiber channel driver 214, write pending (WP) destage 216, and thread scrubber 218 thread groups. For example, the IO machine 212 can perform front-end related IO services known to those skilled in the art. Similarly, the fiber channel driver 214 can enable the HS slice S1 to receive IO workloads from a network (e.g., the SAN 118 of FIG. 1) amongst other related services known to those skilled in the art. Additionally, the WP destage thread group 216 can perform services related to IO write requests known to those skilled in the art. Further, the thread scrubber 218 can perform scrubbing services known to those skilled in the art.

In embodiments, the HA slice S1 can experience an exception event (e.g., a fault) corresponding to at least one of the threads 211. For example, the thread scrubber 218 can encounter an exception event 220. Further, the thread scrubber 218 can experience consecutive occurrences of the exception event 220. In such circumstances, a fault controller (e.g., the controller 142 of FIG. 2) can identify the fault and perform fault mitigation-related services as described in greater detail herein.

Figure 3:
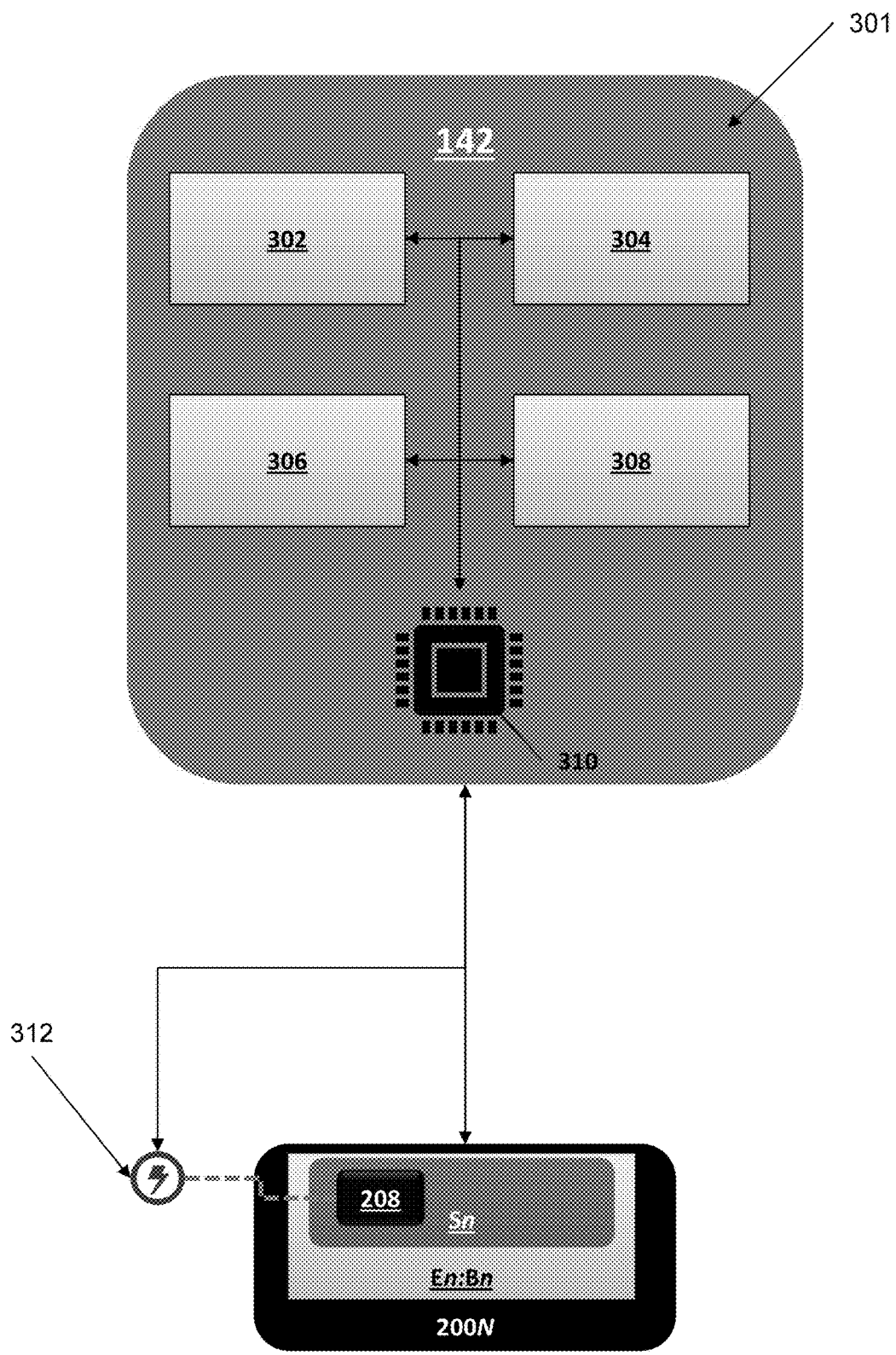
FIG. 3 is a block diagram of a controller in accordance with embodiments of the present disclosure.

Regarding FIG. 3, a controller (e.g., a fault controller) 142 can include logic, circuitry, and hardware resources 301 that perform fault mitigation services. For example, the controller 142 can identify occurrences of exception events (e.g., faults) and the thread or thread group responsible for the exception event. Further, the controller 142 can disable the responsible thread to avoid placing the thread's corresponding slice or director board in a dead director (DD) mode. Accordingly, the slice or director board can continue performing storage-related services unrelated to the disabled thread and corresponding to their remaining active thread, described in greater detail below.

In embodiments, the controller 142 can include an event monitor 302 that monitors activity corresponding to the engines 200A-N. Specifically, the event monitor 302 can receive or retrieve activity logs (e.g., event stack traces) corresponding to the threads of each director board's slices Sn. Further, the event monitor 302 can store the activity logs in local memory 310. For example, each slice's operating system 208 can include daemons 312 that maintain activity logs of, e.g., threads 211 of FIG. 2A. Additionally, the event monitor 302 can parse the activity logs to identify occurrences of exception events (e.g., thread-related logic/hardware faults).

In embodiments, the event monitor 302 can maintain, in local memory 310, a counter for each identified event occurrence that identifies each event's number of consecutive occurrences (e.g., consecutive occurrence counter). For example, each event record in the activity logs can include a unique event identifier (ID). Thus, the event monitor 302 can use each exception event's ID to maintain their consecutive occurrence counters.

In embodiments, the controller 142 can include an event processor 304 that analyzes the exception events identified by the event monitor 302. For example, the event processor 304 can parse each exception event for a process ID (PID) that identifies the process (e.g., exception flow) that encountered a fault. Using the PID, the event processor 304 can parse metadata corresponding to the process to identify its corresponding thread or thread group. For example, the metadata can include a unique thread ID corresponding to the exception flow's corresponding thread or thread group.

In embodiments, the resources 301 can also include a thread analyzer 306 that determines a relationship of a thread to its corresponding slice's performance or functionality. For example, a slice's threads (e.g., threads 211 of FIG. 2) can include one or more masks identifying their respective dependencies. The dependencies can include other threads of a slice, hardware (e.g., processors), or slice-related logic. Accordingly, the thread analyzer 306 can analyze a thread's dependencies to determine the impact of the thread or its corresponding exception event on the overall performance or functionality of the thread's corresponding slice. For instance, the thread analyzer 306 can determine whether the slice can remain operational without access to functionalities corresponding to the thread. Thus, the thread analyzer 306 can maintain a data structure in the local memory 310 that identifies a thread's relationship with the operational capabilities of its corresponding slice (e.g., a slice relationship data structure).

In embodiments, the controller 142 can include a thread manager 308 that controls a thread's operational state. Specifically, the thread manager 308 can change a thread's operational state by modifying one or more of its corresponding dependency masks. For example, the thread manager 308 can disable a thread by modifying the thread's dependency mask corresponding to its hardware resources (e.g., processors). For instance, the thread manager 308 can modify a processor mask to remove the thread's processor assignments.

In embodiments, the thread manager 308 can disable the thread scrubber 218 of FIG. 2A in response to an exception event 220. Further, the thread manager 308 can determine if the exception event 220 is a single occurrence or an $n^{th}$ consecutive occurrence using the thread's corresponding consecutive occurrence counter stored in the local memory 310 by the event monitor 302. In addition, the thread manager 308 can use the consecutive occurrence counter to determine if occurrences of the exception event 220 exceed a threshold. Further, the thread manager 308 can identify the thread scrubber's impact on the operational state of the HA slice S1 using the slice relationship data structure stored in the local memory 310 by the thread analyzer 304.

Thus, the thread manager 308 can isolate the thread scrubber 218 based on the consecutive occurrence counter corresponding to the exception event 220 and the thread scrubber's relationship impact with the HA slice S1. Specifically, the thread manager 308 can change the thread scrubber's processor dependency mask to remove its processor assignments. For example, the thread manager 308 can generate a modified processor dependency mask that removes the thread scrubber's processor assignments. Further, the thread manager 308 can instruct the HA slice's OS 208 to perform an exception recovery. For example, the OS 208 can reboot using a recovery IML that loads threads of the HA slice S1 using any modified masks (e.g., the modified processor dependency mask) generated by the thread manager 308. Accordingly, the HA slice S1 is loaded without the thread scrubber 218.

The following text includes details of a method(s) or a flow diagram(s) per embodiments of this disclosure. Each method is depicted and described as a set of alterable operations for simplicity of explanation. Additionally, one or more operations can be performed in parallel, concurrently, or in a different sequence. Further, not all the illustrated operations are required to implement each method described by this disclosure.

Figure 4:
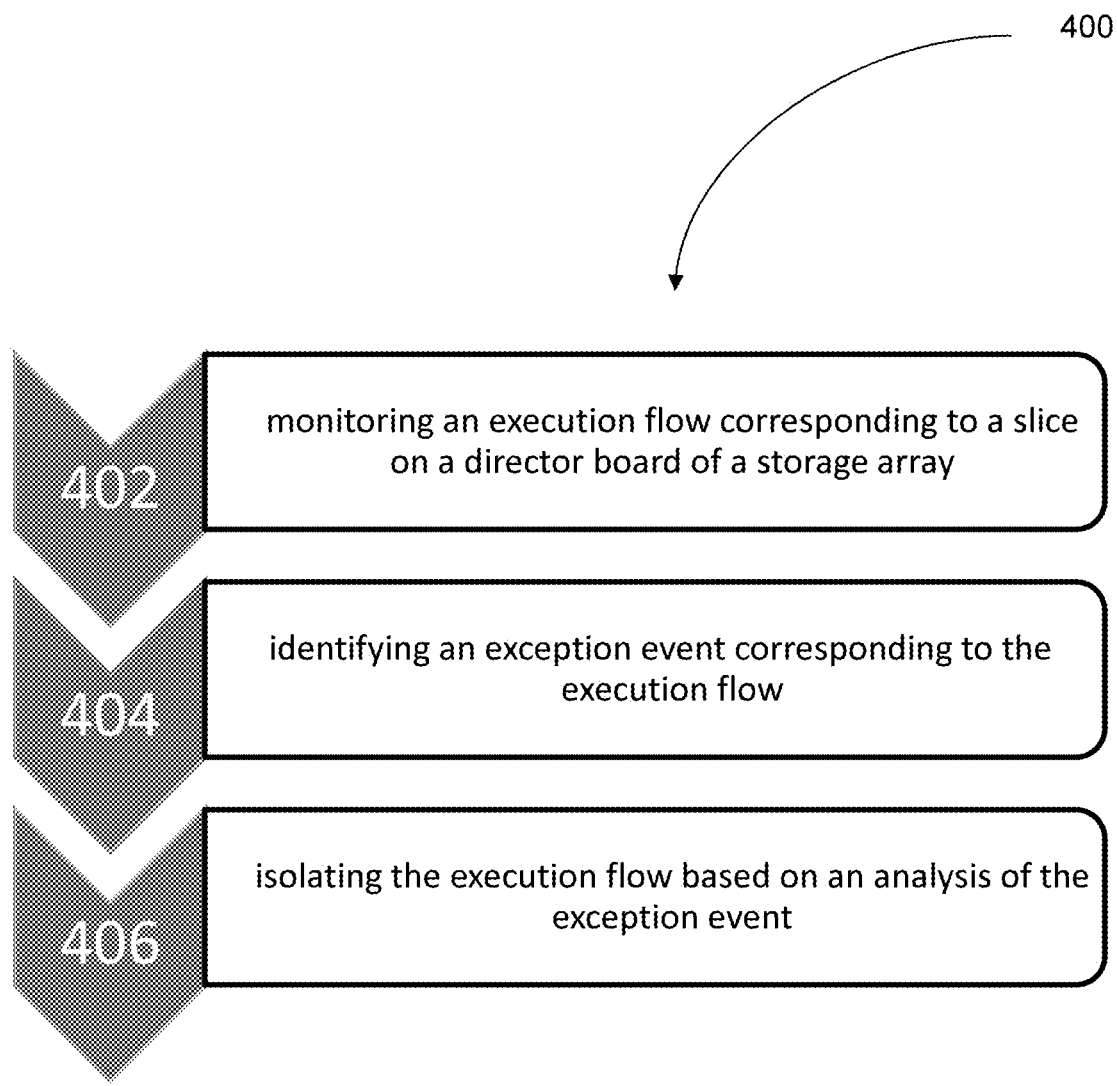
FIG. 4 is a flow diagram of a method for isolating faults corresponding to a thread or thread group of a director board or a slice of a director board in accordance with embodiments of the present disclosure.

Regarding FIG. 4, a method 400 relates to isolating faults corresponding to a thread or thread group of a director board (e.g., board E1:B1 of FIG. 2) or a director board's slice (e.g., Slice 1 of board E1:B1 of FIG. 2). In embodiments, the controller 142 of FIG. 1 can perform all or a subset of operations corresponding to the method 400.

For example, the method 400, at 402, can include monitoring an execution flow corresponding to a slice on a director board of a storage array. For example, the execution flow can include one or more of a thread and a thread group. Additionally, at 404, the method 400 can include identifying an exception event corresponding to the execution flow. Further, the method 400, at 406, can include isolating the execution flow based on an analysis of the exception event.

Further, each operation can include any combination of techniques implemented by the embodiments described herein. Additionally, one or more of the storage array's components 108 can implement one or more of the operations of each method described above.

Using the teachings disclosed herein, a skilled artisan can implement the above-described systems and methods in digital electronic circuitry, computer hardware, firmware, or software. The implementation can be a computer program product. Additionally, the implementation can include a machine-readable storage device for execution by or to control the operation of a data processing apparatus. The implementation can, for example, be a programmable processor, a computer, or multiple computers.

A computer program can be in any programming language, including compiled or interpreted languages. The computer program can have any deployed form, including a stand-alone program, subroutine, element, or other units suitable for a computing environment. One or more computers can execute a deployed computer program.

One or more programmable processors can perform the method steps by executing a computer program to perform the concepts described herein by operating on input data and generating output. An apparatus can also perform the method steps. The apparatus can be a special-purpose logic circuitry. For example, the circuitry is an FPGA (field-programmable gate array) or an ASIC (application-specific integrated circuit). Subroutines and software agents can refer to portions of the computer program, the processor, the special circuitry, software, or hardware that implements that functionality.

Processors suitable for executing a computer program include, by way of example, both general and special purpose microprocessors and any one or more processors of any digital computer. A processor can receive instructions and data from a read-only memory, a random-access memory, or both. Thus, for example, a computer's essential elements are a processor for executing instructions and one or more memory devices for storing instructions and data. Additionally, a computer can receive data from or transfer data to one or more mass storage device(s) for storing data (e.g., magnetic, magneto-optical disks, solid-state drives (SSDs, or optical disks).

Data transmission and instructions can also occur over a communications network. Information carriers that embody computer program instructions and data include all nonvolatile memory forms, including semiconductor memory devices. The information carriers can, for example, be EPROM, EEPROM, flash memory devices, magnetic disks, internal hard disks, removable disks, magneto-optical disks, CD-ROM, or DVD-ROM disks. In addition, the processor and the memory can be supplemented by or incorporated into special-purpose logic circuitry.

A computer with a display device enabling user interaction can implement the above-described techniques, such as a display, keyboard, mouse, or any other input/output peripheral. The display device can, for example, be a cathode ray tube (CRT) or a liquid crystal display (LCD) monitor. The user can provide input to the computer (e.g., interact with a user interface element). In addition, other kinds of devices can enable user interaction. Other devices can, for example, be feedback provided to the user in any form of sensory feedback (e.g., visual feedback, auditory feedback, or tactile feedback). Input from the user can, for example, be in any form, including acoustic, speech, or tactile input.

A distributed computing system with a back-end component can also implement the above-described techniques. The back-end component can, for example, be a data server, a middleware component, or an application server. Further, a distributing computing system with a front-end component can implement the above-described techniques. The front-end component can, for example, be a client computer having a graphical user interface, a Web browser through which a user can interact with an example implementation or other graphical user interfaces for a transmitting device. Finally, the system's components can interconnect using any form or medium of digital data communication (e.g., a communication network). Examples of communication network(s) include a local area network (LAN), a wide area network (WAN), the Internet, a wired network(s), or a wireless network(s).

The system can include a client(s) and server(s). The client and server (e.g., a remote server) can interact through a communication network. For example, a client-and-server relationship can arise by computer programs running on the respective computers and having a client-server relationship. Further, the system can include a storage array(s) that delivers distributed storage services to the client(s) or server(s).

Packet-based network(s) can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), 802.11 network(s), 802.16 network(s), general packet radio service (GPRS) network, HiperLAN), or other packet-based networks. Circuit-based network(s) can include, for example, a public switched telephone network (PSTN), a private branch exchange (PBX), a wireless network, or other circuit-based networks. Finally, wireless network(s) can include RAN, Bluetooth, code-division multiple access (CDMA) networks, time division multiple access (TDMA) networks, and global systems for mobile communications (GSM) networks.

The transmitting device can include, for example, a computer, a computer with a browser device, a telephone, an IP phone, a mobile device (e.g., cellular phone, personal digital assistant (PDA) device, laptop computer, electronic mail device), or other communication devices. The browser device includes, for example, a computer (e.g., desktop computer, laptop computer) with a world wide web browser (e.g., Microsoft® Internet Explorer® and Mozilla®). The mobile computing device includes, for example, a Blackberry®.

Comprise, include, or plural forms of each are open-ended, include the listed parts, and contain additional unlisted elements. Unless explicitly disclaimed, the term 'or' is open-ended and includes one or more of the listed parts, items, elements, and combinations thereof.

What is claimed is:

1. A method comprising:
monitoring an execution flow corresponding to a slice on a director board of a storage array, wherein the execution flow includes one or more of a thread and a thread group;
identifying an exception event corresponding to the execution flow;
determining if the exception event corresponds to previous consecutive exception events of the execution flow; and
isolating the execution flow based on an analysis of the exception event.

2. The method of claim 1, further comprising:
parsing at least one event stack trace to determine if the exception event corresponds to previous exception events of the execution flow.

3. The method of claim 1, further comprising:
determining whether an operational status of the slice is compromised without the execution flow.

4. The method of claim 3, further comprising:
preventing the slice and the director board from entering a dead director (DD) mode if, without the execution flow, the operational status of the slice is uncompromised.

5. The method of claim 1, further comprising:
providing the execution flow with a mask defining its dependencies; and
identifying dependencies of the execution flow using its mask.

6. The method of claim 5, further comprising:
identifying a crash event occurrence;
identifying the exception event as a cause of the crash event occurrence; and
identifying the exception flow as the source of the crash event occurrence based on a process identifier (ID) corresponding to the exception event.

7. The method of claim 6, wherein the process ID includes a thread number identifying the execution flow as a thread source of the exception event.

8. The method of claim 7, further comprising:
identifying at least one processor related to the execution flow using the execution flow's mask.

9. The method of claim 8, further comprising:
disabling the execution flow from running when the at least one processor initiates an initial microcode load (IML) after the exception event occurs.

10. A system with a processor and memory, the system configured to:
monitor an execution flow corresponding to a slice on a director board of a storage array, wherein the execution flow includes one or more of a thread and a thread group;
identify an exception event corresponding to the execution flow;
determine if the exception event corresponds to previous consecutive exception events of the execution flow; and
isolate the execution flow based on an analysis of the exception event.

11. The system of claim 10, further configured to:
parse at least one event stack trace to determine if the exception event corresponds to previous exception events of the execution flow.

12. The system of claim 10, further configured to:
determine whether an operational status of the slice is compromised without the execution flow.

13. The system of claim 12, further configured to:
prevent the slice and the director board from entering a dead director (DD) mode if, without the execution flow, the operational status of the slice is uncompromised.

14. The system of claim 10, further configured to:
provide the execution flow with a mask defining its dependencies; and
identify dependencies of the execution flow using its mask.

15. The system of claim 14, further configured to:
identify a crash event occurrence;
identify the exception event as a cause of the crash event occurrence; and
identify the exception flow as the source of the crash event occurrence based on a process identifier (ID) corresponding to the exception event.

16. The system of claim 15, wherein the process ID includes a thread number identifying the execution flow as a thread source of the exception event.

17. The system of claim 16, further configured to:
identify at least one processor related to the execution flow using the execution flow's mask.

18. The system of claim 17, further configured to:
disable the execution flow from running when the at least one processor initiates an initial microcode load (IML) after the exception event occurs.

* * * * *